Patented Mar. 14, 1933                                                        1,901,816

UNITED STATES PATENT OFFICE

EMIL LÜSCHER, OF BASEL, SWITZERLAND, ASSIGNOR TO THE FIRM LONZA ELEK-TRIZITATASWERKE UND CHEMISCHE FABRIKEN AKTIENGESELLSCHAFT, OF BASEL, SWITZERLAND

ABSORPTION OF OXIDES OF NITROGEN

No Drawing. Application filed August 30, 1930, Serial No. 479,095, and in Switzerland September 13, 1929.

Concentrated nitric acid is capable of absorbing oxides of nitrogen, such as $NO_2$ or $N_2O_4$ in considerable proportion, the proportion being higher the higher the concentration of the acid. The practical application of nitric acid of high concentration as an absorbing agent for oxides of nitrogen presents the disadvantage that the lower oxides of nitrogen, which are always contained to some extent in mixtures of gases produced in the synthesis of nitric acid by burning air or in the oxidation of ammonia, reduce the costly concentrated nitric acid. The complete conversion of the lower oxides of nitrogen contained in the combustion gases to $NO_2$ has not been realized in practice, because the reaction would be too slow, or the space required for the oxidation would be too large.

The process of the present invention for absorbing oxides of nitrogen by means of nitric acid consists in bringing gases containing oxides of nitrogen, produced under conditions for obtaining the maximum practical oxidation, and particularly such gases rich in oxygen, which have been obtained by burning ammonia by means of pure oxygen or gases rich in oxygen, into intimate contact in stages with nitric acid of increasing concentration, and finally the most highly concentrated nitric acid, and then returning the exhaust gases, which have been freed from oxides of nitrogen and nitric acid, to the combustion chamber, while making good the oxygen which has been consumed. There is used for the first absorption stage a nitric acid which is at least so highly concentrated that it is in equilibrium with the gases containing oxides of nitrogen which are to be subjected to the absorption, this acid having as its chief purpose the control of the water content of the gases passing through the absorption apparatus. This first absorption stage is followed by a second, in which a somewhat more highly concentrated nitric acid is used. The purpose of this stage is to convert lower oxides of nitrogen still present in the combustion gases into $NO_2$ or $N_2O_4$, an oxidation which means the reduction of a corresponding quantity of nitric acid in accordance with the following equation:

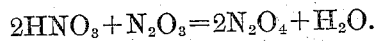

The nitric acid reduced in this manner can be continuously regenerated by the oxygen present in the mixture of gases rich in oxygen, which is being subjected to absorption. When the mixture of gases containing oxides of nitrogen is poor in oxygen, the reduced acid may be regenerated by a separate treatment with nitric oxide and oxygen. The necessary concentration of about 70-80 per cent. nitric acid is obtained without use of pressure in a very short time, while the production of particularly concentrated absorption acid (about 90-100 per cent. strength) requires operation under pressure and a period of reaction of several hours.

In the last absorption stage, which contains the expensive nitric acid of high per cent. strength, only gases still containing $NO_2$ have to be dealt with, which are practically indifferent towards this acid. In this acid the main quantity of the oxides of nitrogen in the combustion gases is retained in the form of dissolved $N_2O_4$.

By using gases containing oxides of nitrogen oxidized as far as possible, obtained in known manner by burning ammonia by means of pure oxygen or gases rich in oxygen, in conjunction with the foregoing absorption system, the following advantages are obtained:—

(1). The so-called equilibrium acid used for the first stage of the absorption has in this case an essentially higher concentration than that used when the oxidation gases have been obtained by burning ammonia by means of air.

(2). The water produced in the oxidation of the ammonia need be separated only in part because the water remaining in the gas yields continuously with $N_2O_4$ and $O_2$ nitric acid of high concentration.

(3). The somewhat stronger nitric acid which follows the so-called equilibrium acid does not have to be continuously renewed because the oxidizing power of the mixture of gases rich in oxygen suffices for the continual regeneration of this acid.

(4). Owing to the high speed of oxidation of the lower oxides of nitrogen by pure oxygen, it is possible in the improved process to work at higher temperatures. In particular, cooling by means of brine, as has been usual hitherto, is no longer necessary, particularly in the first portion of the absorption plant, where nearly the whole of the oxidation process occurs.

(5). This mode of working is therefore very advantageous because the working conditions can be very easily varied (for instance in respect of the water content of the gases to be subjected to absorption), so that the oxides of nitrogen contained therein can be recovered exclusively in the form of $N_2O_4$, or so that a more or less large proportion of the said oxides can be converted continuously into nitric acid of determined concentration. In respect of the commercial aspect of the process, it is to be observed that a remarkably small absorption space is needed for its operation, namely at most 1/20th of that hitherto usual.

The nitric acid contained in the residual gases which are practically free from oxides of nitrogen can be recovered easily and quantatively in the form of a solid nitrate or as dilute nitric acid. The nitric acid rich in oxides of nitrogen produced in the absorption system can be worked up in known manner, for example by fractional distillation, to produce acid of high percentage strength and pure $NO_2$ or $N_2O_4$.

What I claim is:—

1. A process for the absorption of oxides of nitrogen by means of nitric acid, wherein gases containing oxides of nitrogen in the highest possible state of oxidation, particularly when also rich in oxygen, obtained in known manner by burning ammonia in pure oxygen or gases rich in oxygen, are brought into intimate contact in stages with nitric acid of successively higher concentration and finally with acid of the highest concentration, and then the exhaust gases freed from oxides of nitrogen and nitric acid are returned to the combustion chamber, while compensating the consumed oxygen.

2. A process for the absorption of oxides of nitrogen by means of nitric acid, wherein gases containing oxides of nitrogen in the highest possible state of oxidation, particularly when also rich in oxygen, obtained in known manner by burning ammonia in pure oxygen or gases rich in oxygen, are brought into intimate contact in stages with nitric acid of successively higher concentration and finally with acid of the highest concentration, a nitric acid being used for the first stage of absorption, which is at least of so high a concentration that it is in equilibrium with the gases containing oxides of nitrogen to be absorbed, whereupon after the final stage the exhaust gases freed from oxides of nitrogen and nitric acid are returned to the combustion chamber, while compensating the consumed oxygen.

3. A process for the absorption of oxides of nitrogen by means of nitric acid, wherein gases containing oxides of nitrogen in the highest possible state of oxidation, particularly when also rich in oxygen, obtained in known manner by burning ammonia in pure oxygen or gases rich in oxygen, are brought into intimate contact in stages with nitric acid of successively higher concentration and finally with acid of the highest concentration, and then the exhaust gases freed from oxides of nitrogen and nitric acid are returned to the combustion chamber, while compensating the consumed oxygen, the nitric acid of high strength from the gases coming from the last absorption stage being worked up to dilute nitric acid.

4. A process for the absorption of oxides of nitrogen by means of nitric acid, wherein gases containing oxides of nitrogen in the highest possible state of oxidation, particularly when also rich in oxygen, obtained in known manner by burning ammonia in pure oxygen or gases rich in oxygen, are brought into intimate contact in stages with nitric acid of successively higher concentration and finally with acid of the highest concentration, and then the exhaust gases freed from oxides of nitrogen and nitric acid are returned to the combustion chamber, while compensating the consumed oxygen the nitric acid of high strength from the gases coming from the last absorption stage being worked up directly to solid nitrate.

5. A process for the absorption of oxides of nitrogen by means of nitric acid, wherein gases containing oxides of nitrogen in the highest possible state of oxidation, particularly when also rich in oxygen, obtained in known manner by burning ammonia in pure oxygen or gases rich in oxygen, are brought into intimate contact in stages with nitric acid of successively higher concentration and finally with acid of the highest concentration, and then the exhaust gases freed from oxides of nitrogen and nitric acid are returned to the combustion chamber, while compensating the consumed oxygen the nitric acid rich in oxides of nitrogen as produced being worked up to highly concentrated acid and nitrogen-tetroxide.

6. The process for the absorption of oxides of nitrogen from gases, such as may be obtained in known manner by burning ammonia in oxygen-rich gases, which comprises successively subjecting said gases to the action of nitric acid of such concentration that substantial elimination of the moisture content of the gases takes place, then to the action of nitric acid of relatively increased concentration whereby oxidation of the lower nitrogen oxides to a higher state of oxidation takes place, and finally to the action of nitric acid of still higher concentration whereby absorption of the higher nitrogen oxides takes place.

In witness whereof I have hereunto signed my name this 21st day of August 1930.

EMIL LÜSCHER.